(12) United States Patent
DeForest et al.

(10) Patent No.: US 9,223,162 B2
(45) Date of Patent: Dec. 29, 2015

(54) DISPLAY HAVING A FLEXURED ELEMENT

(75) Inventors: Laura M. DeForest, San Mateo, CA (US); James M. Cuseo, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 121 days.

(21) Appl. No.: 13/444,301

(22) Filed: Apr. 11, 2012

(65) Prior Publication Data
US 2013/0271697 A1    Oct. 17, 2013

(51) Int. Cl.
*G02F 1/1333* (2006.01)
*G02F 1/1335* (2006.01)

(52) U.S. Cl.
CPC .... *G02F 1/133305* (2013.01); *G02F 1/133308* (2013.01); *G02F 1/133608* (2013.01); *G02F 2001/133331* (2013.01); *G02F 2001/133334* (2013.01); *G02F 2201/503* (2013.01); *Y10T 29/49826* (2015.01)

(58) Field of Classification Search
CPC ............... G02F 1/133308; G02F 1/133608; G02F 2201/503; G02F 2001/133334
USPC ...................... 349/58–60, 158, 160
See application file for complete search history.

(56) References Cited

U.S. PATENT DOCUMENTS

| | | | |
|---|---|---|---|
| 6,861,136 B2 | 3/2005 | Verlinden | |
| 7,199,518 B2 | 4/2007 | Couillard | |
| 7,242,398 B2 | 7/2007 | Nathan | |
| 7,535,462 B2 | 5/2009 | Spath et al. | |
| 8,094,247 B2 | 1/2012 | Allemand et al. | |
| 8,164,698 B2 | 4/2012 | Kim et al. | |
| 8,294,869 B2 | 10/2012 | Yamaguchi et al. | |
| 2005/0160653 A1* | 7/2005 | Regelin | 40/771 |
| 2006/0204675 A1 | 9/2006 | Gao | |
| 2008/0218369 A1 | 9/2008 | Krans | |
| 2009/0147167 A1 | 6/2009 | Park | |
| 2009/0243817 A1* | 10/2009 | Son | 340/407.2 |
| 2011/0216020 A1 | 9/2011 | Lee et al. | |
| 2011/0285640 A1* | 11/2011 | Park et al. | 345/173 |
| 2012/0127387 A1 | 5/2012 | Yamato et al. | |
| 2012/0200812 A1* | 8/2012 | Qi et al. | 349/106 |
| 2014/0016043 A1 | 1/2014 | Chen et al. | |

* cited by examiner

*Primary Examiner* — Phu Vu
(74) *Attorney, Agent, or Firm* — Brownstein Hyatt Farber Schreck, LLP

(57) ABSTRACT

A display device having a flexured element. More particularly, the display device may incorporate a cover glass with one or more flexure bearing sections. The flexure bearing may permit the cover glass to flex and/or bend in response to stresses or strains while still maintaining contact with an attachment point. If the attachment points have different heights, for example, the cover glass may flex at the flexure bearing, thereby permitting the portion of the cover glass between the attachment points to maintain a relatively planar alignment.

20 Claims, 9 Drawing Sheets

DISPLAY HAVING A FLEXURED ELEMENT

TECHNICAL FIELD

Embodiments described herein generally relate to display devices, and more particularly to a display device having a flexured element.

BACKGROUND

Many modern electronic devices include integrated displays, or interact with standalone displays. These displays may depict a staggering array of information, from text, to graphics and images, to video and so on. One common form of display is the liquid crystal display, which uses liquid crystals to selectively transmit light and thus form visible images.

In many liquid crystal displays, a backlight is used to provide light that may be gated or transmitted by the liquid crystals. In some cases, however, light from the backlight may leak to the front of the display, even when such light is not desired. This may cause visible illumination at the front of the display at undesirable times. Light leakage may distort text, images and the like, or render them visually unappealing.

Accordingly, there is a need in the art to reduce or minimize light leakage in many displays.

SUMMARY

One embodiment described herein takes the form of a display for an electronic device, having: a liquid crystal module; a cover glass; a display stack affixing the liquid crystal module to the cover glass; and a flexure bearing formed on a first side of the cover glass.

Another embodiment described herein may take the form of an electronic device, comprising: an enclosure; a display affixed to the enclosure at at least one mounting point; and a processor within the enclosure and operative to at least partially control the display; wherein the display includes at least one flexure bearing, the flexure bearing separating a first portion of the display from a second portion of the display, the second portion of the display affixed to the at least one mounting point.

Yet another embodiment may take the form of a method for manufacturing a display, including the operations of: forming at least one flexure bearing on a cover glass, the flexure bearing defining a first segment and a second segment of the cover glass; affixing a liquid crystal module to the cover glass; and affixing the cover glass to a mounting point of a structure within the first segment, such that the first segment may bend relative to the second segment.

These and other embodiments will become apparent to one of ordinary skill in the art upon reading the specification and reviewing the accompanying figures.

DETAILED DESCRIPTION

Generally, one or more embodiments disclosed herein may take the form of a display device having a flexured element. More particularly, the display device may incorporate a cover glass with one or more flexure bearing sections. The flexure bearing may permit the cover glass to flex and/or bend in response to stresses or strains while still maintaining contact with an attachment point. If the attachment points have different heights, for example, the cover glass may flex at the flexure bearing, thereby permitting the portion of the cover glass between the attachment points to maintain a relatively planar alignment.

The flexure bearing(s) may extend across the entirety of a side of the cover glass or only a portion of a side. A flexure bearing may be formed by removing a portion of the cover glass in a strip or line, for example. As another example, a flexure bearing may be formed by removing linearly-aligned sections while leaving full cover glass in other linearly-aligned sections. Essentially, the latter embodiment may resemble a dashed line, where each dash equates to an area having a portion of the cover glass removed.

Typically, although not necessarily, the cover glass is removed from a side of the glass that is inward-facing with respect to the display. That is, the flexure bearing usually is formed on a side of the cover glass that does not face a viewer during operation of the display. In some embodiments, however, it may be formed on the viewer-facing side of the cover glass.

The flexure bearing may be a thinned section of the cover glass. The cover glass may be thinned or removed through mechanical operations, such as cutting or routering, the application of electromagnetic energy (such as a laser), water jet cutting, and the like. The exact manner in which the cover glass is thinned may vary between embodiments, or even between flexure bearings in the same cover glass piece. As one example, the flexure bearing may take the form of a living hinge, where the bearing is formed from a portion of the cover glass. In another embodiment, the flexure bearing may be formed from a composite or material other than the cover glass, and mated to the cover glass.

Figure 1:
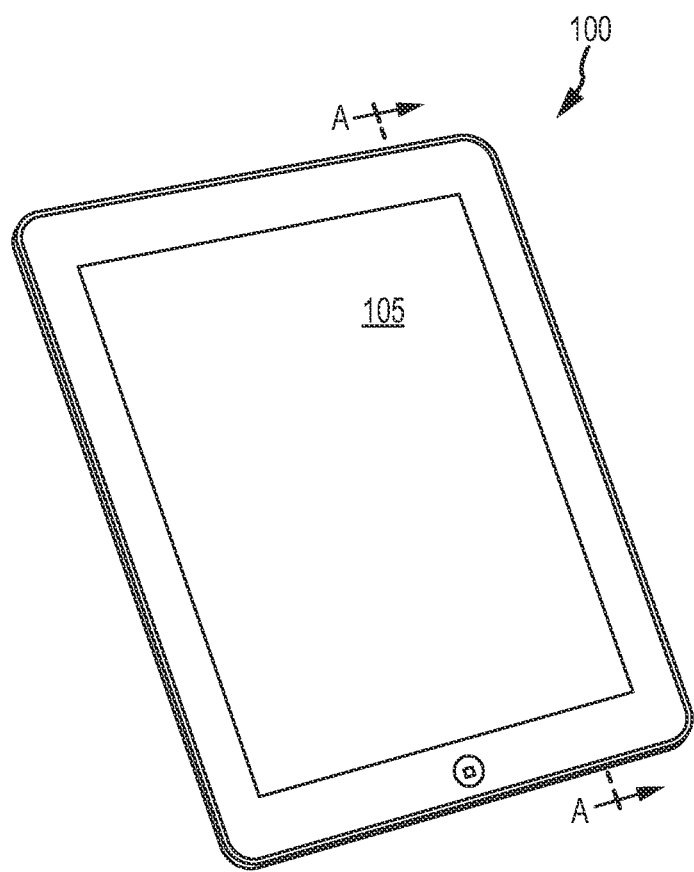
FIG. 1 generally depicts a sample electronic device.

Likewise, the cover glass may be thinned at one or more various times during the manufacturing process. For example, the cover glass may be thinned prior to chemically treating the cover glass; chemical treatment of the glass may enhance its tensile strength and/or resistance to cracking or chipping. Alternately, the cover glass may be thinned after chemical treatment. As one example, the areas to be thinned may be masked prior to chemical treatment, thereby preventing the chemical from interacting with (and strengthening) the glass in the masked region. Glass may be removed from the masked region to create a flexure bearing after the chemical strengthening process. a. FIG. 1 generally depicts a sample electronic device 100. The electronic device 100 may incorporate a display 105 therein. Sample electronic devices include mobile telephones, tablet computing devices (as illustrated in FIG. 1), notebook computers, monitors or other display devices for use with an associated computing device, televisions, and the like. The display may be, for example, a liquid crystal module (LCM) screen 115 adhered to a cover glass 110. The LCM may include not only a liquid crystal display positioned between two layers of glass but also one or more protective coatings or layers. For example, a surface treatment layer, protective layer, polarizer, optical filter, retarder and the like may be stacked with, above, below or above and below the liquid crystal display and or the glass layers in the LCM. For example, a sample LCM may have a polarizer on top, a first glass layer next, a liquid crystal display adjacent the first glass layer, a second glass layer beneath the liquid crystal display, and another polarizer adjacent the second glass layer. Regardless of the presence of absence of the various coatings and/or layers, the LCM 115 may be adhered to the cover glass. (The LCM and cover glass are best shown in FIG. 2.)

Generally, in certain embodiments the LCM screen 115 may be affixed to the cover glass 110. (As previously mentioned, the LCM may instead be adhered to an intervening layer. However, for purposes of clarity, such intervening layers are not depicted or discussed further herein; it should be understood that sections of this document or embodiments discussing the LCM adhered to the cover glass are also intended to cover embodiments in which the LCM is adhered to an intervening layer, which is in turn adhered to the cover glass.) In one embodiment, the LCM 115 is adhered to the cover glass 110 by a liquid optically clear adhesive 120 (LOCA). The LOCA may be relatively thin, on the order of several microns thick. The LOCA may be invisible to the human eye and generally does not significantly degrade the appearance or capabilities of the LCM. In some embodiments, an optically clear adhesive film may be employed instead of, or in addition to, the LOCA.

One or more indium-tin-oxide (ITO) layers 125 may be deposited on the LCM 115 or adhered between the LCM and the cover glass 110. These ITO layers may permit capacitive sensing of a touch on outer surface of the display screen. If ITO layers are present, they may be adhered to both the LCM and the cover glass by layers of LOCA. The ITO 125 may be formed in a grid pattern in order to provide capacitive sensing in both vertical and horizontal directions. Alternately, two separate ITO layers may be used, one of which provides touch sensing in a first direction and one of which provides touch sensing in a second direction. For example, one ITO layer may have rows of ITO deposited thereon, while the other has columns deposited thereon. Other touch-sensing technologies may be used instead of capacitive touch sensing. For example, resistive touch-sensing technologies may be employed and the appropriate technology may be incorporated into the display of FIG. 1.

Figure 2:
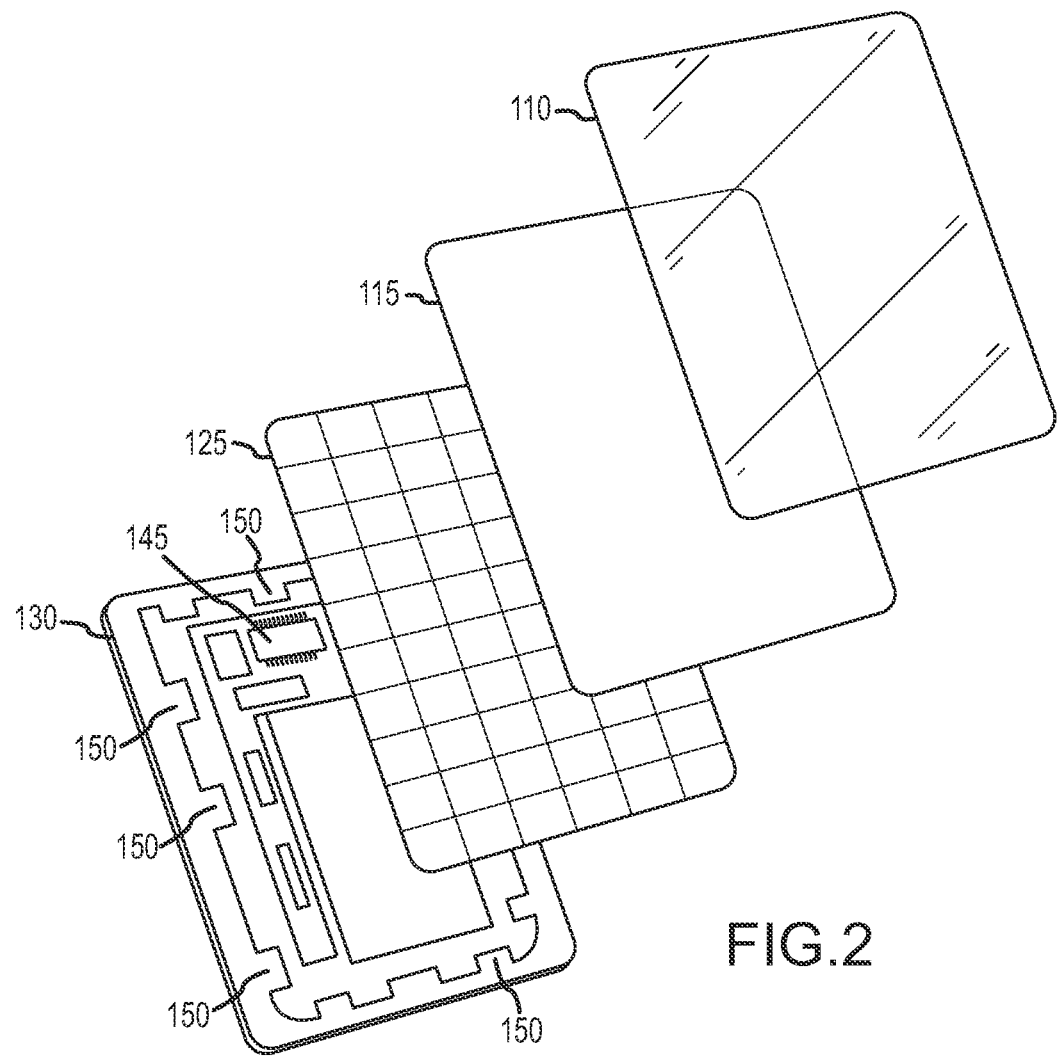
FIG. 2 is a partially-exploded view of the sample electronic device of FIG. 1.

FIG. 2 is a partially-exploded view of the sample electronic device 100 of FIG. 1. As shown to best effect in FIG. 2, among other elements the electronic device 100 may include a housing 130, an LCM 115 and a cover glass 110. The housing may define one or more attachment points to which the cover glass may be affixed. In some embodiments, the cover glass may be adhered to the mounting point or points. In order embodiments, the cover glass 110 may be mechanically affixed to the mounting point or points 135. Essentially, the cover glass may be affixed to the mounting point(s) in any desired or known fashion. It should also be appreciated that the mounting points 35 may be differently configured than is shown in FIG. 2. Accordingly, FIG. 2 is provided by as an illustration of one sample embodiment and general principles related thereto; other embodiments may move or vary the mounting points without departing from the spirit or scope of this application.

In certain embodiments, such as the one shown in FIG. 2, the cover glass 110 may be sized to overlay all or substantially all of the front face of the enclosure 130. That is, the width and length of the cover glass (defined along the X and Y axes shown on FIG. 2) may substantially or exactly equal the width and length of the enclosure. In other embodiments, the cover glass 110 may be smaller in one or more dimensions than the enclosure. In still other embodiments, the cover glass 110 may extend at least partly beyond one or more edges of the enclosure 130.

A backlighting system also may be included in the display 105. The backlighting system generally illuminates the LCM 115, as the LCM itself produces no light. The backlighting system may be located adjacent to the LCM or remote therefrom. Certain embodiments may use a cold cathode fluorescent lamp backlight, although others may use LEDs as backlights. LED backlights may be colored or white. Generally, varying the power to the backlight varies the illumination of the system. A lightguide may optically couple the light from the backlighting system to the LCM 115.

The enclosure generally contains one or more electronic components that permit the electronic device 100 to function in its intended manner. For example, the enclosure may contain a substrate 140, upon which may be mounted a processor 145, memory, storage media, camera module and the like. Electronic circuitry may be formed on the substrate. In some cases, multiple substrates 140 may be present within the enclosure 130. A variety of sensors, such one or more accelerometers, gyroscopes, light sensors, microphones and the like may also be contained within the device enclosure and operatively connected to one or more other electronic components.

As one example, the processor 145 may be operatively connected to at least the memory and display 105, as well as one or more inputs such as the aforementioned capacitive sensing layer 125, and may depict, remove, alter or adjust images on the display, optionally in response to an input, sensor reading and/or state change of the electronic device or software operating thereon. Generally, the various electronic components within the enclosure 130 may affect the display of graphics, images, and/or text on the display 105 in accordance with the operating system and other software executed by the electronic device, and further with user input and/or input from one or more sensors.

Figure 3:
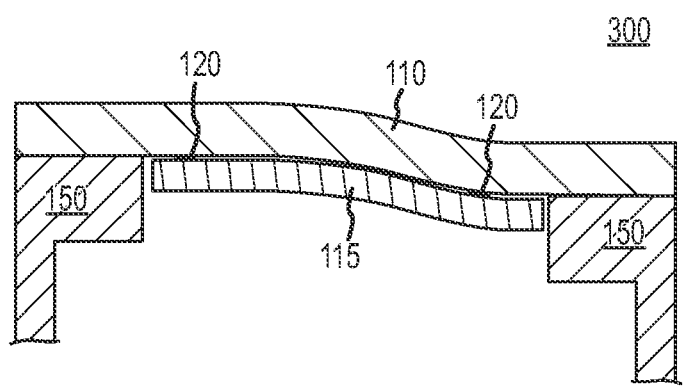
FIG. 3 is a simplified, partial cross-sectional view of an electronic device, similar to that shown in FIG. 1, and taken along line A-A of FIG. 1.

FIG. 3 is a simplified, partial cross-sectional view of an electronic device 300, similar to that shown in FIG. 1, and taken along line A-A of FIG. 1. The simplified cross-sectional view of FIG. 3 is generally shown at the block level to illustrate certain principles discussed herein, and is not intended to provide accuracy with respect to relative sizes, dimensions, physical characteristics and the like.

The electronic device 300 that is shown in FIG. 3 generally may include multiple mounting points 150, each of which are affixed to, or a portion of, the enclosure 130. The mounting points 150 may extend to different heights or otherwise be out of plane with respect to one another, as shown in FIG. 3. The mounting points 150 may be discrete segments, may run the length of the enclosure 130 and/or cover glass 110, or may otherwise be appropriately configured to provide a mounting surface for edges or other portions of the cover glass. It should be appreciated that the cover glass 110 need not be mounted to a mounting point 150 only at the glass edges, but instead could be mounted conceivably at any suitable point of the glass.

Typically, the cover glass 110 is affixed to each mounting point 150 and the LCM 115 is adhered to the cover glass. The LCM may be fully laminated to the cover glass, such that substantially all of the LCM is affixed to the cover glass, or may be adhered to the cover glass only at certain points. The latter is shown in FIG. 3, but the discussion herein may apply equally to either fully- or partially-laminated LCMs.

If the mounting points 150 are out of plane with one another, the cover glass 110 may be twisted or otherwise pulled into a non-flat configuration, as shown in FIG. 3. Essentially, the cover glass must deform to account for the different heights of the mounting points so long as the glass is mounted to both mounting points (or all mounting points, in the case of more than two).

As the cover glass 110 is twisted, torque or otherwise put under strain due to the disparate heights of the mounting points 150, the affixed LCM 115 is likewise put under strain. This may cause the LCM to improperly seal to the backlighting layer of the display 105, or may cause the LCM to pull away from the backlighting layer. Thus, gaps between the backlighting layer and LCM may exist through which light may leak from the backlights to the upper (e.g., user-visible) surface of the LCM. Users may perceive light through these gaps even when the display shows a fully black image, as well as when the display shows a color image. This phenomenon, known as "light leakage," may be distracting to the user, visually unappealing, and/or may affect the quality, brightness, color and legibility of images reproduced on the display.

In addition, the strain placed on the LCM 115 may cause the liquid crystals in the LCM panel itself to partially untwist or to otherwise misalign. In either case, the misaligned liquid crystals may be prevented from fully blocking light emanating from the backlight. This, again, may cause light leakage that is perceptible to a viewer. Further, the strain may cause the LOCA or other adhesive affixing the glass to the LCM to fail.

Figure 4:
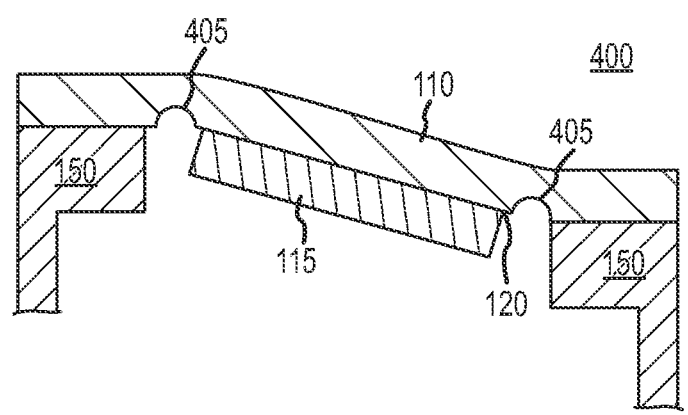
FIG. 4 is a simplified, partial cross-sectional view of an electronic device, similar to that shown in FIG. 1, taken along line A-A of FIG. 1 and showing a flexure bearing.

FIG. 4 is a cross-sectional view of an electronic device 400 similar to that shown in FIG. 1, taken along line A-A of FIG. 1. As with the embodiment depicted in FIG. 3, the mounting points 150 are out of plane. Here, however, flexure bearings 405 are formed in the cover glass proximate the mounting points. The flexure bearings 405 generally are placed between the LCM 115 and the mounting point 150, and need not be proximate the mounting points.

The flexure bearings 405 permit the cover glass 110 to flex at the flexure bearing. Since the cover glass may flex, relatively little stress is transmitted from the mounting point(s) to the center of the cover glass. Accordingly, the center (e.g., the portion between the flexure bearings) remains relatively flat. In turn, the LCM 115 also may remain flat. This may reduce the likelihood of the LCM 115 pulling away from or improperly sealing to the backlight layer. This arrangement also may reduce the misalignment of liquid crystals in the LCM due to stress on the crystals. The reduction in stress on the LCM may reduce light leakage to the visible side of the LCM.

Accordingly, the use of one or more flexure bearings 405 formed in the cover glass 110 may reduce light leakage in the display 105. Cover glass having such flexure bearings, also referred to as "flexure glass," may advantageously reduce stress on the LCM 115 and minimize, eliminate or reduce light leakage.

It should be appreciated that flexure glass 110 may have a single flexure bearing 405. For example, the second mounting point's upper surface could be angled so that only the leftmost flexure bearing is required for the center portion of the cover glass to remain flat and thereby avoid transmitting strain to the LCM.

It should be appreciated that the ability of the cover glass 110 to flex likewise may increase the active life of the LOCA 120 bonding the LCM 115 to the cover glass 110. Because stress and flex on both the cover glass and LCM are reduced through operation of the flexure bearings, the LCM may be less prone to peeling away from the cover glass and/or breaking the adhesive bond of the LOCA.

Figure 5:
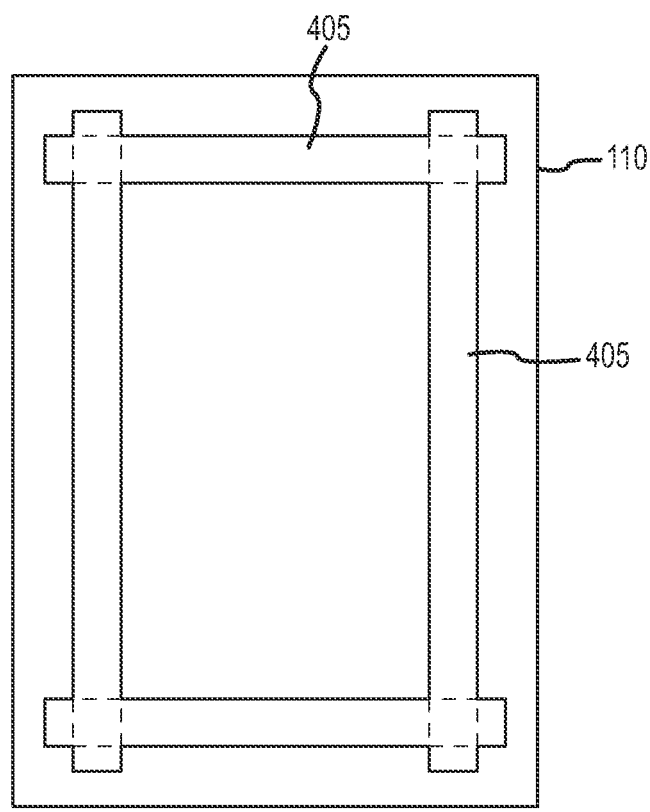
FIG. 5 is a rear view of the cover glass suitable for use with a sample electronic device, such as that shown in FIG. 1, and showing an alternative embodiment of a flexure bearing.

Alternately, multiple flexure bearings 405 may be present in flexure glass 110. As one example, four flexure bearings may be defined on a rear wall of the flexure glass, such that each flexure bearing runs generally parallel to an edge of the glass. FIG. 5 is a rear view of the cover glass 110 suitable for use with a sample electronic device 100, such as that shown in FIG. 1. This rear view depicts the aforementioned multiple flexure bearings 405 formed in the back side of the cover glass 110.

Figure 6:
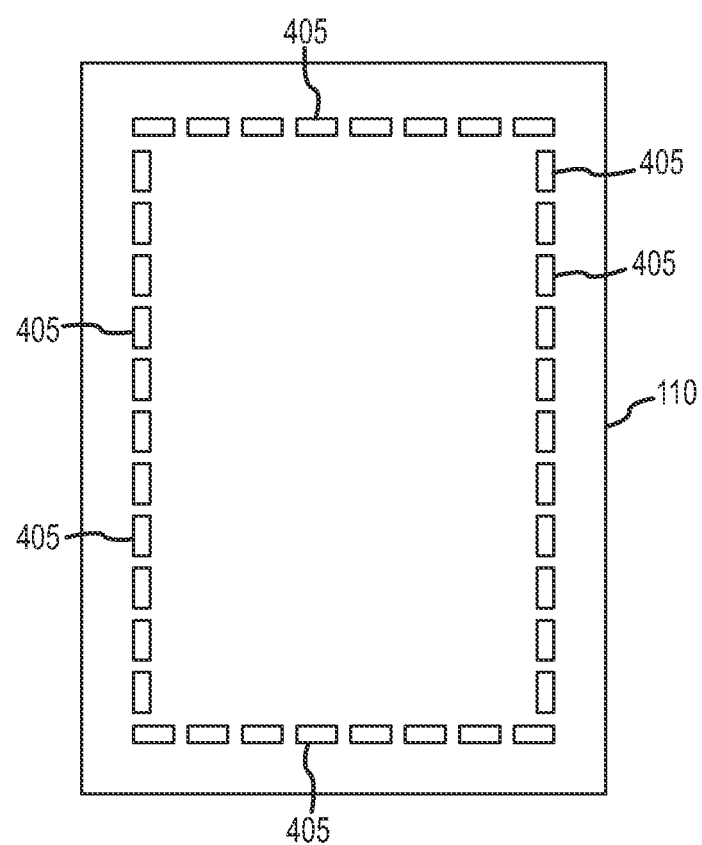
FIG. 6 is a rear view of an alternative embodiment of cover glass having flexure bearings formed therein, similar to the view of FIG. 5.

Still other embodiments may form a series of smaller flexure bearings 405 that, taken together may act to reduce stress on the center portion of flexure glass 110 and on the associated LCM. FIG. 6 is a rear view of an alternative embodiment of cover glass 110 having flexure bearings 405 formed therein, similar to the view of FIG. 5. The multiple series of flexure bearings are each formed as a discrete scallop, divot or depression in the cover glass. Generally, there are four separate groups of such depressions. Each flexure bearing within a group is linearly aligned with the other flexure bearings in the group. The flexure bearings 405 in each group may be considered to form a dashed line. Such an approach may again reduce, limit or minimize stress on the center of the flexure glass. The arrangement shown in FIG. 6 may be useful when discrete mounting points are employed or where it is impractical to form a single long flexure bearing. A combination of the "dashed flexure bearing" approach of FIG. 6 and the single flexure bearing approach of FIG. 5 may be used in a single embodiment.

Figure 7:
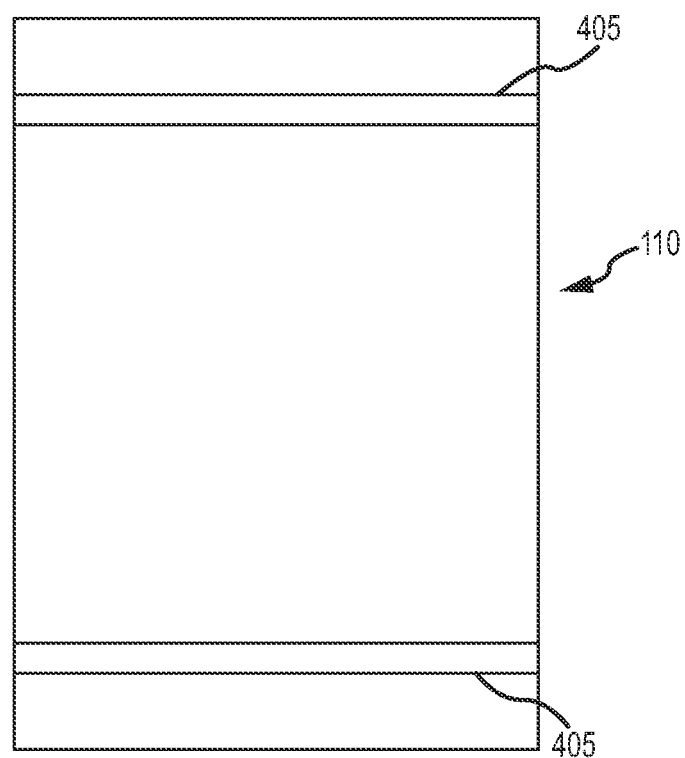
FIG. 7 is a rear view of a sheet of cover glass having multiple flexure bearings formed thereon.

FIG. 7 is yet another rear view of a sheet of cover glass 110 having multiple flexure bearings 405 formed thereon. In this embodiment, flexure bearings are formed adjacent to two edges of the cover glass, permitting flexing along the axis perpendicular to the flexure bearings. By contrast, the embodiment of FIG. 5 may flex along two axes, each of which are perpendicular to a set of parallel flexure bearings 405. Essentially, each flexure bearing permits the cover glass to flex along an axis perpendicular to the flexure bearing.

As yet another option, flexure bearings 405 may be machined or otherwise formed solely in the cover glass 110 around the areas attaching to the mounting points 150. That is, the flexure bearings need not extend entirely across a dimension of the cover glass. Instead, they may be cut into squares, rectangles, circles, L-shapes or any other shape that may encompass or segment off the attachment areas of the cover glass from the portion of the glass adhered to the LCM.

The flexure bearings 405 generally operate to concentrate all deformation to occur in a localized region, rather than spreading that deformation across the surface of the cover glass or to weak spots in the cover glass 110. Controlling the geometry and location of the flexure bearings 405 permits control of overall cover glass deformation. Thus, although embodiments described herein have focused on isolating flexing resulting from misalignment of the mounting points 150, other embodiments may employ flexure bearings to relieve stress, strain, torque and the like resulting from other attachments or misalignments.

Figure 8:
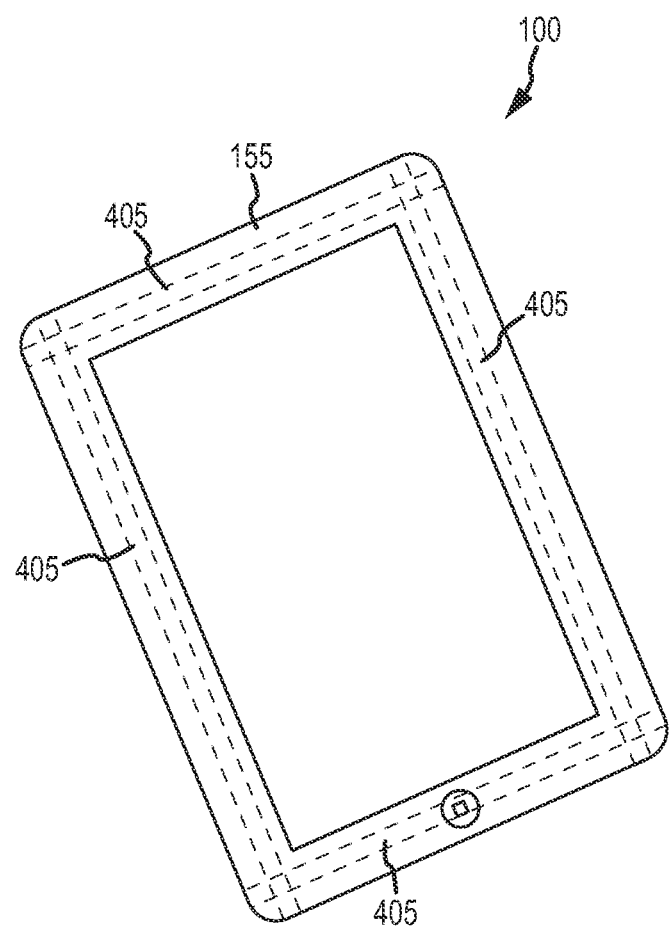
FIG. 8 is a front view of a sample electronic device, showing the relationship between the black mask and the flexure bearings in the cover glass.

FIG. 8 is a front view of a sample electronic device 100, showing the relationship between the black mask 155 and the flexure bearings 405 in the cover glass 110. The flexure bearings are shown as dashed lines to illustrate their positions beneath and relative to the black mask. Typically, the black mask 155 hides the flexure bearings 405 from view during normal viewing and/or operation of the device 100. Thus, the flexure bearings generally are not visible to a viewer during normal operation of the display.

The black mask 155 may be formed by printing or otherwise depositing opaque ink onto a surface of the cover glass 110 or by applying a surface treatment on the cover glass. Alternatively, the black layer may be a thin film that is applied to the cover glass. Generally, the black mask 155 covers a portion of the cover glass 110 and shields it from view by a viewer of the display 105. This shielded portion may include the top surface of the cover glass that overlies the flexure bearings (and thus the flexure bearings themselves). It should be appreciated that the black mask may be any color desired, and need not be black.

In other embodiments, different elements of the electronic device 100 and/or display may hide the flexure bearings 405 from view. For example, in some embodiments a portion of the enclosure 130 may overlie the cover glass 110. In such embodiments, the attachment points 150 may be located on a front side of the cover glass, and so the flexure bearings may likewise be located on the front side of the cover glass. The overhang of the enclosure may be sufficiently large to mask both attachment points and cover glass.

Figure 9:
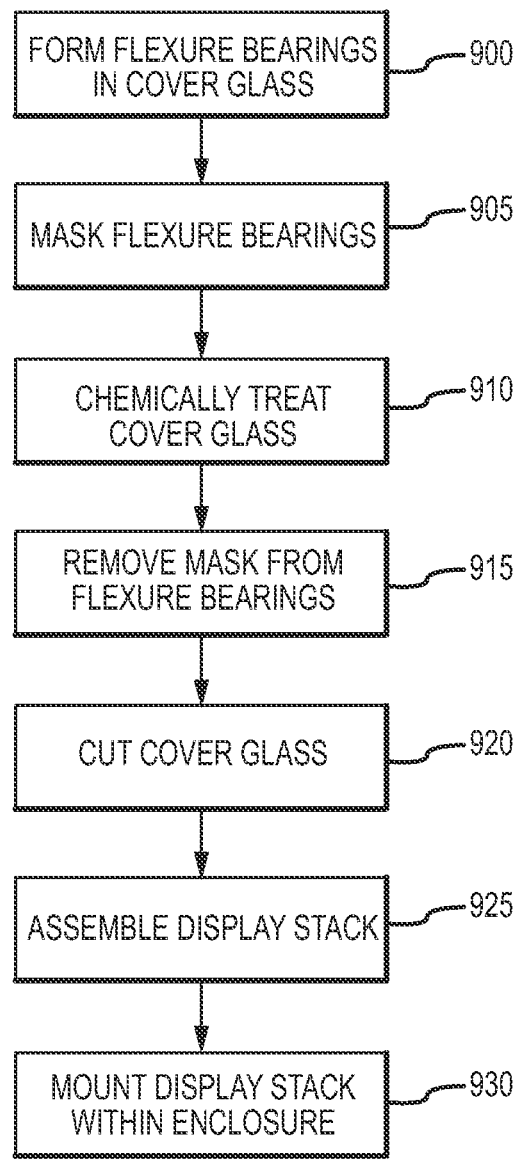
FIG. 9 is a flowchart setting forth sample operations that may be performed as part of a larger process for manufacturing a display for an electronic device.

FIG. 9 is a flowchart setting forth sample operations that may be performed as part of a larger process for manufacturing a display 105 for an electronic device 100. It should be understood that these operations are generally high-level and intended to be illustrative. Further, the operations illustrated primarily focus on creating one or more flexure bearings 405 in cover glass 110 and assembling the resulting product into a larger display. Thus, particular operations that may be employed to manufacture a display and/or an electronic device may be omitted.

In operation 900, the cover glass 110 is machined, cut or otherwise processed to form one or more flexure bearings in at least one side of the cover glass. The exact amount of material removed from the cover glass may vary by embodiment, with respect to the maximum degree of flex desired, the overall stiffness desired in the finished cover glass, and other factors. This machining process may be performed on multiple cover glasses 110 simultaneously or near-simultaneously. For example, it is often common for multiple pieces of cover glass to be formed on a single sheet of mother glass. Different sections of the mother glass are each marked to be formed or cut into cover glass. This may permit mass creation of cover glass relatively rapidly, rather than performing operations on each piece of cover glass individually after it has been separated from the mother glass.

In operation 905, the flexure bearings 405 are masked. The masking element may be tape or an adhesive, a mechanical mask, a chemical mask and so on. The purpose of the mask is to prevent the flexure bearings from being chemically strengthened with the rest of the cover glass. It should be appreciated that the masking operation may be omitted in some embodiments, such that the flexure bearing is chemically strengthened.

In operation 910, the cover glass 110 is chemically treated. The chemical treatment, as is known, may strengthen and/or stiffen the cover glass. Insofar as the flexure bearings were masked in operation 905, they are not strengthened as is the rest of the cover class.

In operation 915, the mask is removed from the flexure bearings 405. Next, in operation 920, the cover glass 110 may be cut or otherwise separated from a sheet of mother glass.

In operation 925, the display stack may be assembled. Among other operations, assembly of the display stack may include: bonding the LCM 115 to the cover glass 110 with LOCA 120; bonding other layers such as the aforementioned polarizers, filters, and the like to the cover glass and/or other portions of the display; applying a surface treatment to the cover glass or other outer surface of the display stack; and the like.

Finally, in operation 930, the display stack may be mounted within, atop or to the enclosure. The display stack may be mounted at one or more mounting points as previously discussed.

Some embodiments may omit certain operations described with respect to FIG. 9. As one example, certain embodiments may not mask the flexure bearings prior to chemical treatment. Likewise, other embodiments may have flexure bearings formed by masking a portion of the cover glass prior to chemical treatment, but not removing any material from that area. Material may be removed after chemical treatment or may not be removed at all. In the latter case, the difference in stiffness between the treated and untreated areas may permit the untreated areas to bend sufficiently to act as a flexure bearing even though the cover glass has not been thinned or had material removed.

It should be appreciated that one or more flexure bearings may be formed in or on a cover glass not only to isolate a portion of the cover glass from flexing or experiencing stress, but also to define certain features. A circular flexure bearing may be used to define a button or input area, as one example. The area within the flexure bearing may deform while the area outside the flexure bearing may remain relatively stable. Coupled with a strain gauge or other sensor capable of detecting the deformation of the inner area, touching the inner area may act as an input to the electronic device. The exact shape of the flexure bearing in such embodiments may vary.

Using the principles described herein, a camera lens may likewise be created. The lens may be defined by one or more flexure bearings, such that the interior of the lens is separated from a mounting or attachment point of the lens to the camera or other imaging device.

Although embodiments herein have been described with respect to particular configurations and methods of manufacture, it should be appreciated that other embodiments may omit certain elements, operations and the like, as well as add elements, operations and so forth. For example, in some embodiments the flexure bearing may be filled with a polymer or other flexible material that permits the cover glass to flex and/or bend in the manner described herein, but fills the bearing to the point that the rear side of the polymer is coplanar with the rear side of the cover glass. This may provide a relatively smooth and uniform surface for the rear of the cover glass, for example.

We claim:
1. A display for an electronic device, comprising:
a liquid crystal module;
a cover glass;
a display stack affixing the liquid crystal module to the cover glass; and
a flexure bearing formed on an underside of the cover glass to permit motion of the cover glass with respect to an enclosure of the electronic device.
2. The display of claim 1, wherein the first side of the cover glass faces the liquid crystal module.

3. The display of claim 1, further comprising a backlighting layer and wherein the motion of the flexure bearing prevents light emitted by the backlighting layer from leaking to a front side of the liquid crystal module.

4. The display of claim 3, wherein the display stack comprises at least one of a liquid optically clear adhesive or an optically transparent film.

5. The display of claim 4, wherein the display stack further comprises at least one of a surface treatment layer, protective layer, polarizer, optical filter, or retarder.

6. The display of claim 1, wherein the flexure bearing is a living hinge.

7. The display of claim 6, wherein the flexure bearing is formed by thinning a portion of the underside of the cover glass.

8. The display of claim 7, further comprising at least one mounting point affixed to the cover glass.

9. The display of claim 8, wherein the flexure bearing separates a portion of the underside of the cover glass from a portion of the cover glass affixed to the at least one mounting point.

10. The display of claim 9, wherein the flexure bearing permits the cover glass to bend along an axis perpendicular to the flexure bearing's length, thereby permitting the cover glass to account for a height of the at least one mounting point.

11. The display of claim 10, wherein the flexure bearing prevents at least some force from being applied to the liquid crystal module through the cover glass.

12. An electronic device, comprising:
   an enclosure;
   a display affixed to the enclosure at least one mounting point; and
   a processor within the enclosure and operative to at least partially control the display; wherein the display includes at least one flexure bearing positioned on an underside of a cover glass of the display, the flexure bearing separating a first portion of the display from a second portion of the display, the second portion of the display affixed to the at least one mounting point.

13. The electronic device of claim 12, wherein the display comprises a liquid crystal module affixed to the cover glass.

14. The electronic device of claim 12, wherein the at least one flexure bearing defines a thinned segment of the cover glass, thereby forming a depression in the cover class.

15. The electronic device of claim 14, wherein the at least one flexure bearing further comprises a polymer at least partially filling the depression in the cover glass.

16. The electronic device of claim 12, further comprising:
   a second mounting point; and
   a second flexure bearing separating the second mounting point from the first portion of the display;
   wherein the cover glass flexes at the at least one flexure bearing and the second flexure bearing, thereby not flexing in the first portion of the display.

17. The electronic device of claim 13, wherein the liquid crystal module is affixed to the cover glass at the first portion of the display.

18. A method for manufacturing a display, comprising:
   forming at least one flexure bearing on an interior surface of a cover glass by removing at least a portion of the interior surface of the cover glass, the flexure bearing defining a first segment and a second segment of the cover glass;
   affixing a liquid crystal module to the cover glass; and
   affixing the cover glass to a mounting point of a structure within the first segment, such that the first segment may bend relative to the second segment.

19. The method of manufacturing a display of claim 18, wherein:
   the liquid crystal module is affixed to the cover glass in the second segment of the cover glass; and
   the flexure bearing prevents transmission of stress from the first segment to the second segment.

20. The method of manufacturing a display of claim 19, further comprising:
   forming a second flexure bearing on the interior surface of the cover glass by removing at least a second portion of the interior surface of the cover glass, the second flexure bearing defining a third segment of the cover glass;
   affixing the cover glass to a second mounting point of a structure within the third segment;
   wherein the first and second mount points have differing heights; and
   the second segment of the cover glass is relatively planar between the first and second flexure bearings.

* * * * *